Patented Feb. 9, 1937

2,069,992

UNITED STATES PATENT OFFICE 2,069,992

METHOD OF REFINING ROSIN

Joseph N. Borglin, Wilmington, Del., assignor to Hercules Powder Company, Wilmington, Del., a corporation of Delaware No Drawing. Application July 14, 1934, Serial No. 735,195

17 Claims. (Cl. 87—2)

This invention relates to a method for refining rosin, more particularly by the removal of color bodies therefrom.

The method in accordance with this invention is applicable to the refining of both wood and gum rosin and by its application a dark, low grade rosin may be refined to a pale, high grade rosin. Where the method is applied to the refining of a rosin, such as wood rosin and some low grade gum rosins, containing latent color bodies, i. e. bodies which while normally colorless or nearly so will darken in the presence of air and an alkali, as when a rosin containing such bodies is saponified, latent color bodies as well as visible color bodies will be removed.

Now in accordance with this invention, it has been found that the organic thiocyanates possess a selective solvent action on the color bodies contained by rosin, as compared with solvent action on rosin as such; and that as a consequence the refining of wood and gum rosin, by the removal of color bodies therefrom, may be effected by contacting an organic thiocyanate with a rosin to be refined and separating the thiocyanate and color bodies of the rosin dissolved thereby from the rosin.

More particularly, in accordance with this invention an organic thiocyanate is intimately admixed with a solution of rosin in a solvent which is substantially immiscible or capable of substantial immiscibility with the organic thiocyanate. After the thiocyanate has been thoroughly contacted with the rosin solution, the rosin solution and thiocyanate and color bodies dissolved thereby are permitted to separate into layers and the thiocyanate and dissolved color bodies are decanted off from the rosin solution. The refined rosin is recovered from its solution by evaporating off the solvent, under reduced pressure if desired. The solvent may be reused. The thiocyanate may be recovered for reuse by distillation.

Where an organic thiocyanate to be used according to this invention is normally a solid, it will be heated to liquefy it, or dissolved in a solvent which is substantially immiscible or capable of substantial immiscibility with the rosin solvent. Where a thiocyanate is to a degree miscible with the rosin solvent, an agent which will promote immiscibility will desirably be used and various agents may be used which will promote the selective solvent action of thiocyanates variously. In general, the refining will be carried out at temperatures which will promote the selective solvent action and immiscibility with the rosin solution of the thiocyanates variously.

In proceeding with practical adaptation of this invention, any of the organic thiocyanates may be used, since as a class they have been found to possess a selective solvent action on the color bodies contained in wood and gum rosin. By way of example, but not by way of limitation, in carrying out the method of this invention methyl thiocyanate, ethyl thiocyanate, n-butyl thiocyanate, iso-propyl thiocyanate, o-tolyl iso-thiocyanate, etc. may be used.

When, in carrying out the method in accordance with this invention, a rosin is treated in solution, the solvent for the rosin may be any suitable solvent therefor which is substantially immiscible or capable of being rendered substantially immiscible with the thiocyanate to be used. By way of example, but not by way of limitation, the rosin solvent may be a petroleum hydrocarbon, as gasoline, naphtha, etc., dipentene, or the like.

When, in proceeding, it is desired to utilize an agent to promote the selective solvent action of the thiocyanate variously, for example, sodium hydrosulphite may be used effectively with o-tolyl iso-thiocyanate, sulphur dioxide, liquid or gaseous, may be used effectively with methyl thiocyanate. Where it is desirable to use some agent for promoting immiscibility of a thiocyanate, for example, methanol, 85% ethyl alcohol, etc. may be used. Further, as has been indicated, when a normally solid thiocyanate, as, for example, o-tolyl iso-thiocyanate, is used, it will be heated to fluidity or dissolved in a solvent which is substantially immiscible or capable of substantial immiscibility with the rosin solvent.

As more specifically illustrative of the practical adaptation of the method embodying this invention, for example, 200 parts by weight of a solution of rosin, grading FF in color, in gasoline and containing about 14% of rosin are washed once with 20 parts by weight of methyl thiocyanate at a temperature of about 20° F. The washing may be effected in any desired manner, as by agitation of the thiocyanate with rosin solution. The rosin solution is permitted to settle out and the thiocyanate with dissolved color bodies of the rosin decanted off. The refined rosin solution is then washed with water and the gasoline evaporated, desirably under reduced pressure, say about 700 mm. mercury. A 90% yield of rosin grading I in color is obtained. The thiocyanate may be recovered for reuse by distillation.

As a further illustration, 200 parts by weight of the rosin solution given in the above illustration are given two washes with 20 parts by weight of methyl thiocyanate at a temperature of —15° C. Settlement of the rosin solution is permitted and the thiocyanate and dissolved color bodies decanted off. The solution is then washed with half its volume of 80% alcohol and finally washed with water. The gasoline is evaporated under a pressure of say about 700 mm. mercury. A yield of about 71.5% of rosin grading M + in color is obtained.

As a further illustration 200 parts of the same gasoline-rosin solution are given a wash with 50 parts by weight of ethyl thiocyanate at —15° C. The rosin solution is permitted to separate and the thiocyanate and dissolved color bodies decanted off. The rosin solution is then washed and evaporated under reduced pressure. A yield of about 54% of rosin grading I in color is obtained.

As a further illustration, n-butyl thiocyanate may be used in accordance with the above examples, with the production of a yield of about 61% of rosin grading G + in color.

As a further illustration, 200 parts by weight of the gasoline-rosin solution given above are washed with 35 parts by weight of iso-propyl thiocyanate and 25 parts by weight of methanol at —15° C. On separation of the rosin solution and evaporation of the gasoline, a yield of about 71% of rosin grading I in color will be obtained. The methanol used in this example is used to promote immiscibility between the iso-propyl thiocyanate and the gasoline solvent for the rosin.

As a further illustration for example, 200 parts by weight of the above gasoline-rosin solution, 10 parts by weight of o-tolyl iso-thiocyanate, 20 parts of methanol are refluxed for say about two hours and then cooled to a temperature of about 20° C. On cooling, the gasoline-rosin solution will settle out and the thiocyanate, methanol and dissolved color bodies are decanted off. The rosin solution is washed with 80% alcohol and gasoline evaporated. A yield of about 67.5% of rosin grading H in color will be recovered.

In the above example involving refluxing about 1 part by weight of sodium hydrosulphite may be included. Where the sodium hydrosulphite is included the yield of refined rosin will be increased to about 75% and the color grade of the product will be I.

As still further illustrative, for example, 200 parts by weight of the above gasoline-rosin solution are washed with 10 parts methyl thiocyanate and sulphur dioxide. Separation of the rosin solution from the thiocyanate and dissolved color bodies is effected as described above, the rosin solution washed with water and the gasoline evaporated. A yield of about 82% of rosin grading K + in color is obtained.

In the above illustrations the use of sodium hydrosulphite and of sulphur dioxide will improve the selective solvent action of the thiocyanate, while, as indicated, the use of, for example, methanol will promote immiscibility of the thiocyanate and the gasoline solvent for the rosin.

As a further illustration, 100 parts by weight of the above gasoline-rosin solution are heated to a temperature of about 80° C. with 10 parts of o-tolyl thiocyanate and 15 parts acetone, cooled to about 20° C., the rosin solution separated and gasoline evaporated. A yield of about 71.5 percent of rosin grading H in color is obtained. The acetone will function to dissolve the o-tolyl thiocyanate, which is normally a solid, as compared with refluxing as in the above example, using o-tolyl thiocyanate.

What I claim and desire to protect by Letters Patent is:

1. In a method for refining rosin the steps which comprise contacting rosin in solution in a solvent for the rosin with an organic thiocyanate in a non-solid state, the solvent for the rosin being capable of substantial immiscibility with the thiocyanate and separating the thiocyanate from the rosin solution.

2. A method for refining rosin which includes admixing an organic thiocyanate in a non-solid state with a solution of rosin in a solvent therefor which is capable of substantial immiscibility with the thiocyanate, separating the thiocyanate from the rosin solution and separating the rosin from its solvent.

3. A method for refining rosin which includes admixing an organic thiocyanate in a non-solid state with a solution of rosin in gasoline, separating the thiocyanate and color bodies of the rosin dissolved thereby from the rosin solution and separating the rosin from gasoline.

4. A method for refining rosin which includes admixing an organic thiocyanate in non-solid state with a solution of rosin in a solvent therefor which is capable of substantial immiscibility with the thiocyanate, separating the thiocyanate and color bodies of the rosin dissolved thereby from the rosin solution and separating the rosin from its solvent.

5. A method for refining rosin which includes admixing an organic thiocyanate in solution in a solvent therefor with a solution of rosin in a hydrocarbon solvent therefor which is capable of substantial immiscibility with the thiocyanate solution, separating the thiocyanate solution and color bodies of the rosin dissolved thereby from the rosin solution and separating the rosin from its solvent.

6. A method for refining rosin which includes admixing an organic thiocyanate in a non-solid state with a solution of rosin in a hydrocarbon solvent therefor which is capable of substantial immiscibility with the thiocyanate, separating the thiocyanate and color bodies of the rosin dissolved thereby from the rosin solution in the presence of an agent which will promote immiscibility between the thiocyanate and the rosin solution and separating the rosin from its solvent.

7. A method for refining rosin which includes admixing an organic thiocyanate in a non-solid state with a solution of rosin in a hydrocarbon solvent therefor which is capable of substantial immiscibility with the thiocyanate, separating the thiocyanate and color bodies of the rosin dissolved thereby from the rosin solution in the presence of methanol and separating the rosin from its solvent.

8. A method for refining rosin which includes admixing an organic thiocyanate and a substance adapted to promote the selective solvent action of the thiocyanate on color bodies of the rosin with a solution of rosin in a solvent therefor which is capable of substantial immiscibility with the thiocyanate, separating the thiocyanate, color bodies dissolved thereby and substance adapted to promote the solvent action of the thiocyanate from the rosin solution and separating rosin from the solvent.

9. In a method for refining rosin the step which comprises contacting rosin in solution in a solvent for the rosin with an aliphatic thiocyanate in a non-solid state, the solvent for the rosin being capable of substantial immiscibility with the thiocyanate.

10. In a method for refining rosin the step which comprises contacting rosin in solution in a solvent for the rosin with an aromatic thiocyanate in a non-solid state, the solvent for the rosin being capable of substantial immiscibility with the thiocyanate.

11. In a method for refining rosin the step which comprises contacting rosin in solution in a solvent for the rosin with methyl thiocyanate in a non-solid state, the solvent for the rosin being capable of substantial immiscibility with the thiocyanate.

12. In a method for refining rosin the step which comprises contacting rosin in solution in a solvent for the rosin with ethyl thiocyanate in a non-solid state, the solvent for the rosin being capable of substantial immiscibility with the thiocyanate.

13. In a method for refining rosin the step which comprises contacting rosin in solution in a solvent for the rosin with butyl thiocyanate in a non-solid state, the solvent for the rosin being capable of substantial immiscibility with the thiocyanate.

14. A method for refining rosin which includes admixing methyl thiocyanate with a solution of rosin in a hydrocarbon solvent therefor which is capable of substantial immiscibility with the thiocyanate, separating the thiocyanate and color bodies dissolved thereby from the rosin solution and separating the rosin from its solvent.

15. A method for refining rosin which includes admixing ethyl thiocyanate with a solution of rosin in a hydrocarbon solvent therefor which is capable of substantial immiscibility with the thiocyanate, separating the thiocyanate and color bodies dissolved thereby from the rosin solution and separating the rosin from its solvent.

16. A method for refining rosin which includes admixing butyl thiocyanate with a solution of rosin in a hydrocarbon solvent therefor which is capable of substantial immiscibility with the thiocyanate, separating the thiocyanate and color bodies dissolved thereby from the rosin solution and separating the rosin from its solvent.

17. In a method for refining rosin the steps which comprise contacting rosin in a liquid state with an organic thiocyanate and separating the thiocyanate and color bodies from the rosin.

JOSEPH N. BORGLIN.